US012316033B2

(12) United States Patent
Yang et al.

(10) Patent No.: US 12,316,033 B2
(45) Date of Patent: May 27, 2025

(54) ANTENNA AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventors: Shuo Yang, Beijing (CN); Yunnan Jin, Beijing (CN); Chunnan Feng, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,580

(22) PCT Filed: Apr. 25, 2022

(86) PCT No.: PCT/CN2022/088881

§ 371 (c)(1),
(2) Date: Feb. 16, 2023

(87) PCT Pub. No.: WO2023/205985

PCT Pub. Date: Nov. 2, 2023

(65) Prior Publication Data

US 2024/0266736 A1 Aug. 8, 2024

(51) Int. Cl.
*H01Q 9/04* (2006.01)
*H01Q 1/12* (2006.01)
(Continued)

(52) U.S. Cl.
CPC ............. *H01Q 9/0435* (2013.01); *H01Q 1/36* (2013.01); *H01Q 1/405* (2013.01); *H01Q 1/1271* (2013.01)

(58) Field of Classification Search
CPC ...... H01Q 1/1271; H01Q 1/243; H01Q 1/246; H01Q 1/36; H01Q 1/405; H01Q 9/0435; H01Q 9/0442
See application file for complete search history.

(56) References Cited

U.S. PATENT DOCUMENTS 10,381,750 B2 * 8/2019 Jung ........................ H01Q 1/44
12,062,851 B2 * 8/2024 Oh ........................ H01Q 15/14
(Continued)

FOREIGN PATENT DOCUMENTS

CN 106354007 A 1/2017
CN 110365422 A 10/2019
(Continued)

*Primary Examiner* — Dameon E Levi
*Assistant Examiner* — Leah Rosenberg
(74) *Attorney, Agent, or Firm* — HOUTTEMAN LAW LLC

(57) ABSTRACT

An antenna and an electronic device are provided. The antenna includes a first radiation layer and a first reference electrode layer within a housing, which includes: first and second cover plates opposite to each other, and a connection side plate therebetween; the first and second cover plates and the connection side plate are connected to form an accommodation space; the first radiation layer is on a side of the first cover plate close to the second cover plate; the first reference electrode layer is on a side of the second cover plate close to the first cover plate; the first radiation layer includes at least one radiation unit, each includes a radiation portion and at least one feed line electrically connected thereto; orthographic projections of the radiation portion and the feed line on the first cover plate at least partially overlaps with that of the first reference electrode layer.

16 Claims, 6 Drawing Sheets

(51) Int. Cl.
*H01Q 1/36* (2006.01)
*H01Q 1/40* (2006.01)

(56) References Cited

U.S. PATENT DOCUMENTS

| | | | | |
|---|---|---|---|---|
| 2004/0183788 | A1 | 9/2004 | Kurashima et al. | |
| 2017/0018842 | A1* | 1/2017 | Sano | H01Q 9/0407 |
| 2022/0209414 | A1* | 6/2022 | Byun | H10K 59/40 |
| 2022/0399644 | A1* | 12/2022 | Zhou | H01Q 21/24 |
| 2023/0015184 | A1* | 1/2023 | Choi | G06F 1/1656 |
| 2023/0035749 | A1* | 2/2023 | Jung | H01Q 1/243 |
| 2023/0099250 | A1* | 3/2023 | Tang | H01Q 9/0457 343/848 |

FOREIGN PATENT DOCUMENTS

| | | | |
|---|---|---|---|
| CN | 216055157 | U | 3/2022 |
| WO | WO 2021164038 | A1 | 8/2021 |

* cited by examiner

ANTENNA AND ELECTRONIC DEVICE

TECHNICAL FIELD

The present disclosure relates to the field of communication technology, and in particular to an antenna and an electronic device.

BACKGROUND

As the number of 5G base stations is sharply increasing, there is no doubt that the aesthetics of the environment is influenced to a great extent due to the over-dense layout of the 5G base stations. Therefore, a base station antenna with transparent and aesthetic property becomes a new scheme. Miniaturization is one of key requirements for an antenna design; and how to simultaneously solve the problems of transparency and a low profile of an antenna is nowadays a major trend and subject for an antenna side of the 5G base station.

SUMMARY

The present disclosure is directed to at least one of the technical problems of the prior art, and provides an antenna and an electronic device.

In a first aspect, an embodiment of the present disclosure provides an antenna, including a housing, a first radiation layer and a first reference electrode layer within the housing; the housing includes: a first cover plate and a second cover plate opposite to each other, and a connection side plate connected between the first cover plate and the second cover plate; the first cover plate, the second cover plate and the connection side plate are connected together to form an accommodation space; the first radiation layer is on a side of the first cover plate close to the second cover plate; and the first reference electrode layer is on a side of the second cover plate close to the first cover plate; and the first radiation layer includes at least one radiation unit, each of which includes a radiation portion and at least one feed line electrically connected to the radiation portion; and an orthographic projection of each of the radiation portion and the at least one feed line on the first cover plate at least partially overlaps with an orthographic projection of the first reference electrode layer on the first cover plate.

In some embodiments, in each radiation unit, the at least one feed line includes a first feed line and a second feed line; and an intersection of the first feed line and the radiation portion is a first node; and an intersection of the second feed line and the radiation portion is a second node; and in each radiation unit, extending directions of a line connecting the first node and a center of the radiation portion and a line connecting the second node and the center of the radiation portion intersect with each other.

In some embodiments, each radiation unit further includes a first branch connected to the first feed line and a second branch connected to the second feed line.

In some embodiments, the first radiation layer is on a first base material, which is connected to the first cover plate by a first adhesive layer.

In some embodiments, the first reference electrode layer is on the second base material, which is connected to the second cover plate by a second adhesive layer.

In some embodiments, the first radiation layer and/or the first reference electrode layer includes a metal mesh structure.

In some embodiments, when the first radiation layer and the first reference electrode layer both include the metal mesh structures, orthographic projections of hollowed-out portions of the metal mesh structures of the first radiation layer and the first reference electrode layer on the first cover plate overlap with each other.

In some embodiments, the metal mesh structure has a line width in a range from 2 μm to 30 μm; a line spacing in a range from 50 μm to 200 μm; and a line thickness in a range from 1 μm to 10 μm.

In some embodiments, the first radiation layer further includes a redundant electrode, which is disconnected from each radiation portion and each feed line.

In some embodiments, the connection side plate includes a first side sub-plate connected to the first cover plate and a second side sub-plate connected to the second cover plate; and the first side sub-plate and the second side sub-plate are connected in a plug-in manner.

In some embodiments, each radiation portion is a center-symmetric pattern.

In some embodiments, each of the first cover plate and the second cover plate has a thickness in a range from 1 mm to 3 mm.

In a second aspect, an embodiment of the present disclosure provides an electronic device, which includes the antenna of any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
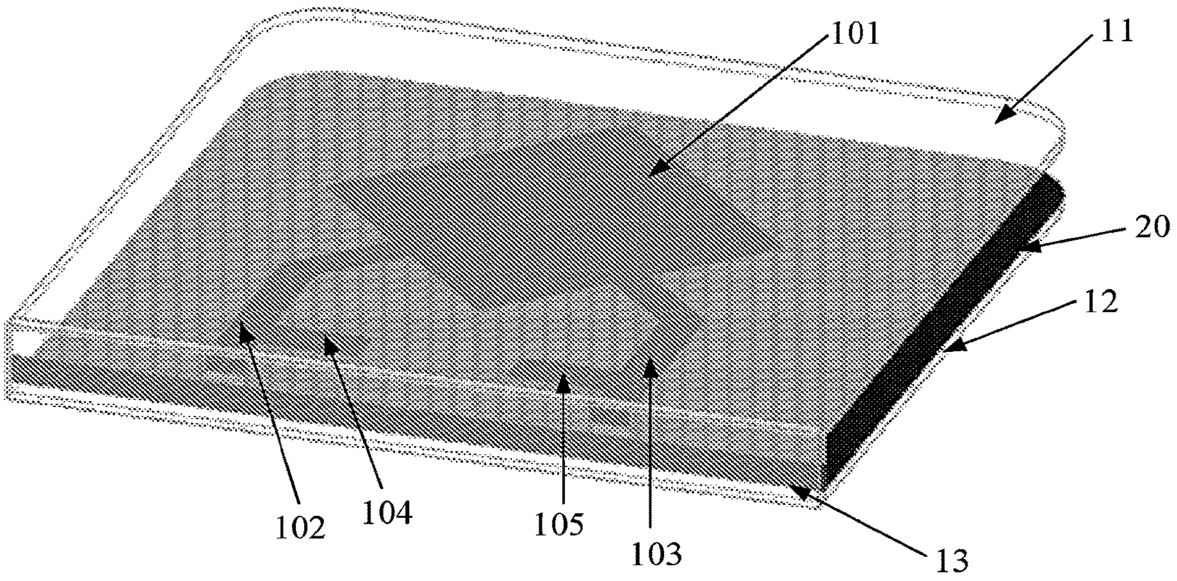
FIG. 1 is a schematic diagram of a structure of an antenna according to an embodiment of the present disclosure.
Figure 2:
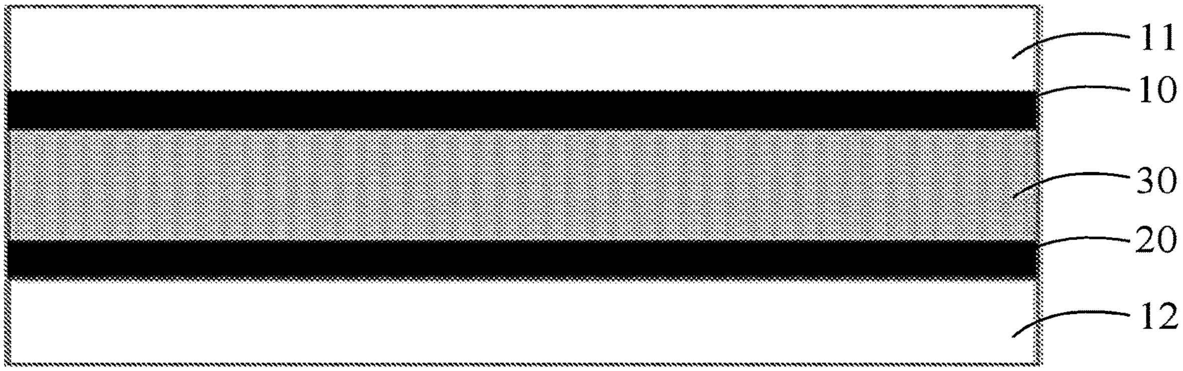
FIG. 2 is a cross-sectional view of an antenna according to an embodiment of the present disclosure.
Figure 3:
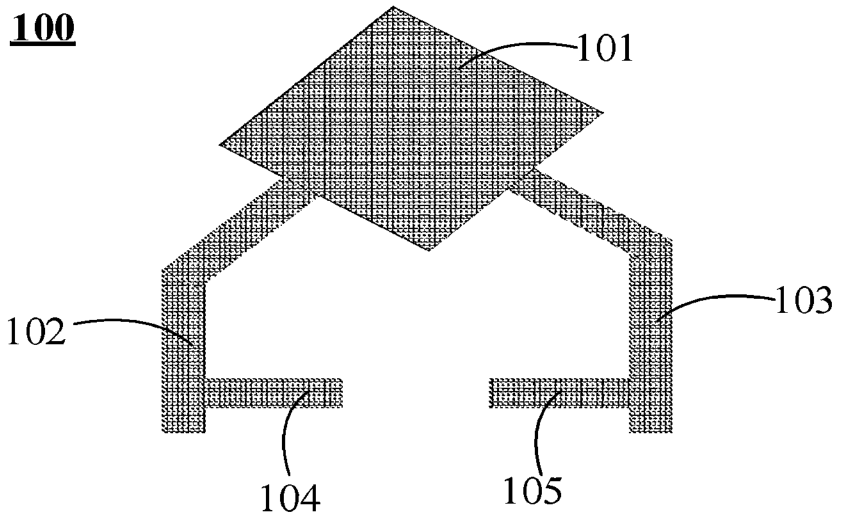
FIG. 3 is a schematic diagram of a radiation unit of an antenna according to an embodiment of the present disclosure.

In a first aspect, FIG. 1 is a schematic diagram of a structure of an antenna according to an embodiment of the present disclosure. FIG. 2 is a cross-sectional view of an antenna according to an embodiment of the present disclosure. FIG. 3 is a schematic diagram of a radiation unit 100 of an antenna according to an embodiment of the present disclosure. As shown in FIGS. 1 to 3, the present disclosure provides an antenna including a housing, a first radiation layer 10 and a first reference electrode layer 20. The first radiation layer 10 and the first reference electrode layer 20 are both arranged within the housing.

Specifically, the housing includes a first cover plate 11 and a second cover plate 12 disposed oppositely to each other, and a connection side plate 13 connected between the first cover plate 11 and the second cover plate 12 and connected to the first cover plate 11 and the second cover plate 12 to form an accommodation space. The first radiation layer 10 is arranged on a side of the first cover plate 11 close to the second cover plate 12 and the first reference electrode layer 20 is arranged on a side of the second cover plate 12 close to the first cover plate 11. The first radiation layer 10 includes at least one radiation unit 100, each of which includes a radiation portion 101 and at least one feed line electrically connected to the radiation portion 101, the feed line is configured to feed the radiation portion 101. An orthographic projection of each of the radiation portion 101 and the feed line on the first cover plate 11 overlaps with an orthographic projection of the first reference electrode layer 20 on the first cover plate 11. For example: the orthographic projection of the first reference electrode layer 20 on the first cover plate 11 covers the orthographic projection of each of the radiation portion 101 and the feed line on the first cover plate 11. In this case, the first radiation layer 10 is arranged on the first cover plate 11 and the first reference electrode layer is arranged on the second cover plate 12, there is a gap between the first radiation layer 10 and the first reference electrode layer 20, i.e. a dielectric layer 30 between the first radiation layer 10 and the first reference electrode layer may be the air. Alternatively, as needed, an inert gas may be filled in the housing as a filling dielectric between the first radiation layer 10 and the first reference electrode layer 20.

It should be noted that in FIG. 1, as an example, each radiation unit 100 includes two feed lines, which are referred to as a first feed line 102 and a second feed line 103, respectively, for convenience of description. Alternatively, only one feed line may be provided for each radiation unit 100, and be configured to feed the radiation portion 101.

In the embodiment of the present disclosure, the first radiation layer 10 and the first reference electrode layer 20 in the antenna are respectively disposed on the first cover plate 11 and the second cover plate 12, so that the integration of the first radiation layer 10, the first reference electrode layer 20 and the housing is realized. With the arrangement, a support structure between the first radiation layer 10 and the first reference electrode layer 20 can be omitted, so that the number of layers of the antenna is reduced, and the light transmittance of the antenna is improved.

With continued reference to FIG. 3, in each radiation unit 100, an intersection of the first feed line 102 and the radiation portion 101 is a first node, and an intersection of the second feed line 103 and the radiation portion 101 is a second node. A line connecting the first node and a center of the radiation portion 101 is a first line segment, a line connecting the second node and the center of the radiation portion 101 is a second line segment, and extending directions of the first line segment and the second line segment intersect with each other. For example: the extending directions of the first line segment and the second line segment are perpendicular to each other. That is, the first and second feed lines 102 and 103 have different feed directions. When the extending directions of the first line segment and the second line segment are perpendicular to each other, the antenna can realize a polarization direction of 0°/90° or ±45°.

Alternatively, the antenna of the embodiment of the present disclosure further includes a first feed structure and a second feed structure, which may be disposed on the connection side plate 13, and the first feed structure is electrically connected (for example, bound through an ACF adhesive (a transparent optical conductive adhesive)) to each first feed line 102. Accordingly, the second feed structure is electrically connected (for example, bound through the ACF adhesive) to each second feed line 103. When the number of the radiation units 100 is multiple, the first feed structure and the second feed structure may both adopt a power division feed network.

In some examples, with continued reference to FIG. 3, each radiation unit 100 further includes a first branch 104 and a second branch 105 electrically connected to the first feed line 102 and the second feed line 103, respectively. The first branch 104 and the second branch 105 are arranged for better impedance matching to improve the radiation efficiency of the radiation unit 100.

Figure 4:
FIG. 4 is a cross-sectional view of a first radiation layer disposed on a first cover plate according to an embodiment of the present disclosure.

In some examples, FIG. 4 is a cross-sectional view of a first radiation layer 10 disposed on a first cover plate 11 according to an embodiment of the present disclosure. As shown in FIG. 4, the first radiation layer 10 is disposed on a first base material 13, which is connected to the first cover plate 11 by a first adhesive layer 14. The first base material 13 is a flexible base material, which includes, but is not limited to, polyimide (PI) or polyethylene terephthalate (PET). A material of the first adhesive layer 14 is an optical clear adhesive, such as the ACF adhesive. A material of the first cover plate 11 includes, but is not limited to, polycarbonate (PC), copolymers of cycloolefin (COP), polymethyl methacrylate (PMMA), or the like. A sum of thicknesses of the first base material 13 and the first radiation layer 10 is in a range from about 50 μm to 250 μm. A thickness of the first cover plate 11 is in a range from about 1 mm to 3 mm.

Alternatively, the specific thickness of each layer can be specifically set according to the product requirements.

Figure 5:
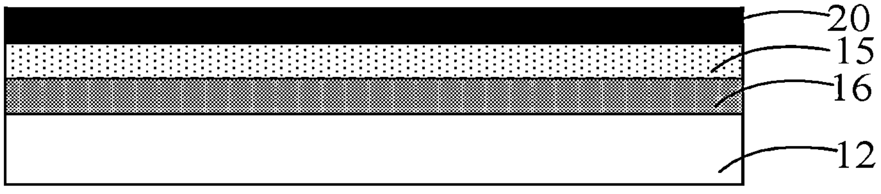
FIG. 5 is a cross-sectional view of a first reference electrode layer disposed on a second cover plate according to an embodiment of the present disclosure.

In some examples, FIG. 5 is a cross-sectional view of a first reference electrode layer 20 disposed on a second cover plate 12 according to an embodiment of the present disclosure. As shown in FIG. 5, the first reference electrode layer 20 is disposed on a second base material 15, which is connected to the second cover plate 12 through a second adhesive layer 16. A material of the second base material 15 and the material of the first base material 13 may be the same. That is, the material of the second base material 15 includes, but is not limited to, polyimide or polyethylene terephthalate. A material of the second adhesive layer 16 may be the same as the material of the first adhesive layer 14, that is, the material of the second adhesive layer 16 may also be an optical clear adhesive, such as the ACF adhesive. A material of the second cover plate 12 may be the same as that of the first cover plate 11, that is, the material of the second cover plate 12 includes, but is not limited to, polycarbonate (PC), copolymers of cycloolefin (COP), polymethyl methacrylate (PMMA), or the like. A sum of thicknesses of the second base material 15 and the first reference electrode layer 20 is in a range from about 50 μm to 250 μm. A thickness of the second cover plate 12 is in a range from about 1 mm to 3 mm. Alternatively, the specific thickness of each layer can be specifically set according to the product requirements.

Figure 6:
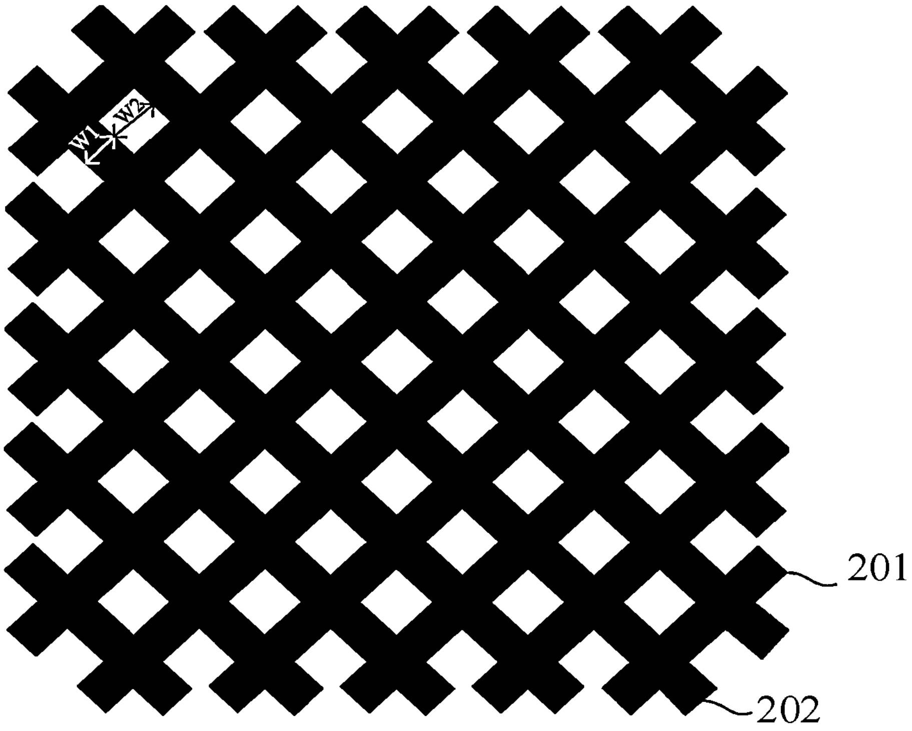
FIG. 6 is a schematic diagram of a structure of a metal mesh structure according to an embodiment of the present disclosure.

In some examples, FIG. 6 is a schematic diagram of a structure of a metal mesh according to an embodiment of the present disclosure. As shown in FIG. 6, the first radiation layer 10 and/or the first reference electrode layer 20 may each employ a metal mesh structure. In the embodiment of the present disclosure, as an example, the first radiation layer 10 and the first reference electrode layer 20 each employ a metal mesh structure for description. The metal mesh structure may include a plurality of first metal lines 201 and a plurality of second metal lines 202 crossing with the plurality of first metal lines 201. For example: extending directions of each first metal line 201 and each second metal line 202 may be perpendicular to each other, thereby forming a square or a rectangular hollowed-out portion. Alternatively, the extending directions of each first metal line 201 and each second metal line 202 of the metal mesh may be not perpendicular to each other. For example: an included angle between the extending directions of each first metal line 201 and each second metal line 202 is 45°, thereby forming a diamond-shaped hollowed-out portion. In some examples, line widths, line thicknesses, and line spacing of each first metal line 201 and each second metal line 202 of the metal mesh structure are preferably equal to each other, but may be different from each other. For example: each of the first metal lines 201 and the second metal lines 202 has a line width W1 in a range from about 1 μm to 30 μm, a line spacing W2 in a range from about 50 μm to 250 μm and a line thickness in a range from about 0.5 μm to 10 μm. The metal mesh structure in the embodiments of the present disclosure may be formed on the first base material 13 or the second base material 15 through processes including, but not limited to, imprinting or etching.

Further, when the first radiation layer 10 and the first reference electrode layer 20 both include the metal mesh structure, orthographic projections of the hollowed-out portions of the metal mesh structures of the first radiation layer 10 and the first reference electrode layer 20 on the first cover plate 11 completely or substantially overlap with each other. It should be noted that the substantially overlapping in the embodiment of the present disclosure means that a width of the overlapping area of the orthographic projections of the hollowed-out portions of the metal mesh structures of the two layers is not greater than 1 time of the line width. In this way, the optical transmittance of the antenna can be effectively improved. In the embodiment of the present disclosure, the light transmittance of the metal mesh structure of each layer is in a range from about 70% to 88%.

Further, the first metal lines 201 and the second metal lines 202 may be made of nanoscale silver paste, or may be made of a metal material such as copper.

Figure 7:
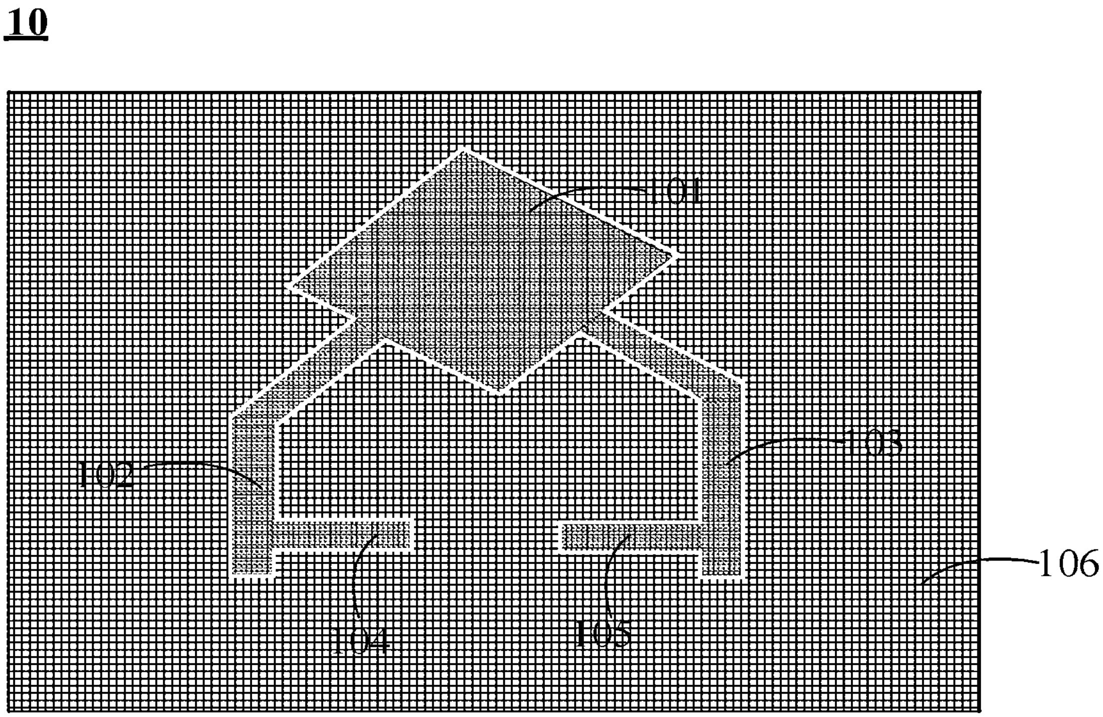
FIG. 7 is a top view of a first radiation layer according to an embodiment of the present disclosure.

In some embodiments, FIG. 7 is a top view of a first radiation layer 10 according to an embodiment of the present disclosure. As shown in FIG. 7, the first radiation layer 10 includes not only each radiation portion 101 and each feed line described above, but also a redundant electrode 106. The redundant electrode 106 is disconnected from each radiation portion 101 and each feed line. For example: the first radiation layer 10 adopts a metal mesh structure, that is, the first radiation layer 10 includes the plurality of first metal lines 201 and the plurality of second metal lines 202 crossing with the plurality of first metal lines 201. At this time, the first metal lines and the second metal lines may be formed on the first cover plate 11, and then the first metal lines 201 and the second metal lines 202 are respectively disconnected at a position where the redundant electrode 106 is disconnected from each radiation portion 101 and each feed line. In this case, the radiation portions 101 and the redundant electrode 106 may be formed through one patterning process, and may be formed by forming a whole layer of first and second metal lines crossing with each other, and then performing a chopping process on the first and second metal lines 201 and 202. In some examples, a width of an opening, where each of the first metal lines 201 and the second metal lines 202 in the first radiation layer 10 is broken, is in a range from about 1 μm to 30 μm, but may be specifically defined according to the radiation requirement of the antenna.

In some examples, a shape of each radiation portion 101 includes, but is not limited to, a center-symmetric pattern such as a quadrangle, a hexagon, an octagon, or the like. In FIG. 1, as an example, a shape of each radiation portion 101 is a quadrangle, but it should be understood that this does not limit the scope of the embodiments of the present disclosure. In some examples, an outline of each radiation portion 101 is polygonal with each interior angle of greater than 90°. For example: the outline of each radiation portion 101 is an octagon, and includes a first side, a second side, a third side, a fourth side, a fifth side, a sixth side, a seventh side, and an eighth side connected in sequence; an extending direction of the first side is the same as that of the fifth side, and is perpendicular to that of the third side. Each first feed line 102 and each second feed line 103 are connected on the second side and the eighth side, respectively. In this case, the polygon is equivalent to a square with four right angles cut off to form flat chamfers, so that the impedance matching is realized, thereby reducing the loss and the number of cross components, and improving the cross polarization ratio of the antenna.

In some examples, the connection side plate 13 of the housing in the embodiments of the present disclosure includes a first side sub-plate connected to the first cover plate 11, and a second side sub-plate connected to the second cover plate 12, and the first side sub-plate and the second side sub-plate are connected in a plug-in manner. For example: the first side sub-plate and the first cover plate 11 have a one-piece structure, the second side sub-plate and the second cover plate 12 have a one-piece structure. A groove is formed on a side of the first side sub-plate close to the second side sub-plate; and an end of the second side sub-plate close to the groove is inserted into the groove. Alternatively, the connection side plate 13 may be fixedly connected to the first cover plate 11 and the second cover plate 12 by screws.

In order to clearly understand the structure and effect of the antenna of the embodiment of the present disclosure, an effect diagram obtained through a simulation for the antenna is described below with reference to the antenna structure shown in FIG. 1.

Referring to FIG. 1, the antenna includes the housing, the first radiation layer 10, and the first reference electrode layer 20. The first radiation layer 10 and the first reference electrode layer 20 are both arranged within the housing. The housing includes the first cover plate 11 and the second cover plate 12 disposed oppositely to each other, and the connection side plate 13 connected between the first cover plate 11 and the second cover plate 12 and connected to the first cover plate 11 and the second cover plate 12 to form the accommodation space. The first radiation layer 10 is arranged on a side of the first cover plate 11 close to the second cover plate 12 and the first reference electrode layer 20 is arranged on a side of the second cover plate 12 close to the first cover plate 11. The first radiation layer 10 includes at least one radiation unit 100, each of which includes the radiation portion 101 and at least one feed line electrically connected to the radiation portion 101, the feed line is configured to feed the radiation portion 101. The orthographic projection of the first reference electrode layer 20 on the first cover plate 11 covers the orthographic projection of each of the radiation portion 101 and the feed line on the first cover plate 11. The dielectric layer 30 between the first radiation layer 10 and the first reference electrode layer may be the air. The first radiation layer 10 and the first reference electrode layer 20 both adopt a metal mesh structure.

Figure 8:
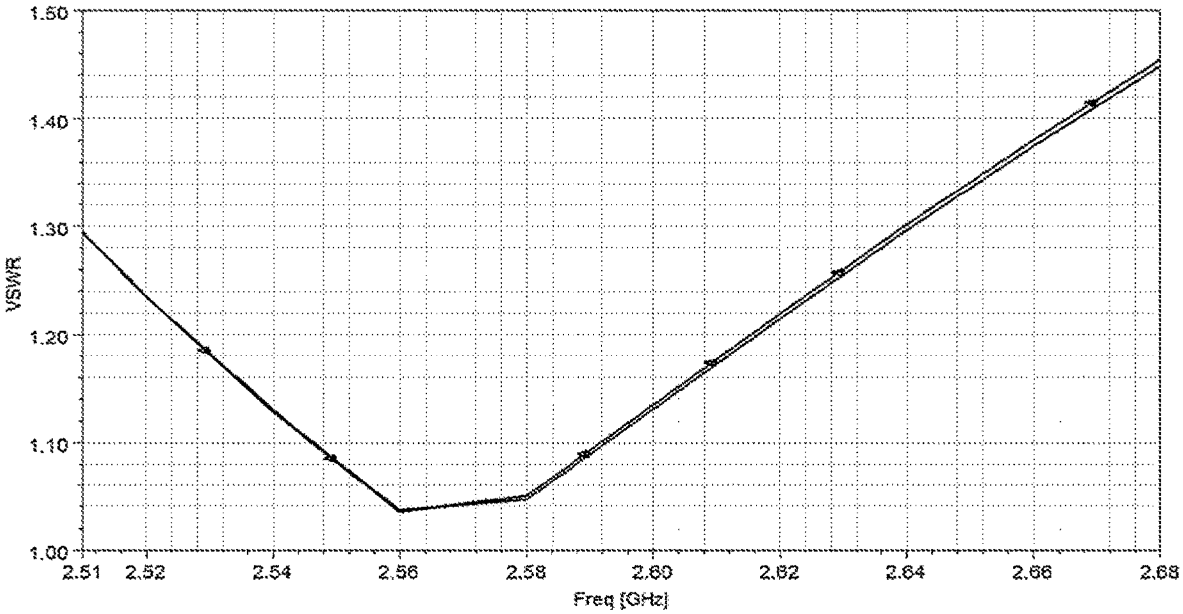
FIG. 8 is a schematic diagram illustrating a standing wave ratio of an antenna according to an embodiment of the present disclosure.

FIG. 8 is a schematic diagram illustrating a standing wave ratio of an antenna according to an embodiment of the present disclosure. As shown in FIG. 8, the antenna of the embodiment of the present disclosure has an excellent broadband, and can cover a frequency band in a range from 2515 MHz to 2675 MHz under the standard that the standing-wave ratio is less than 1.5, thereby ensuring a wider application scenario of the antenna.

Figure 9:
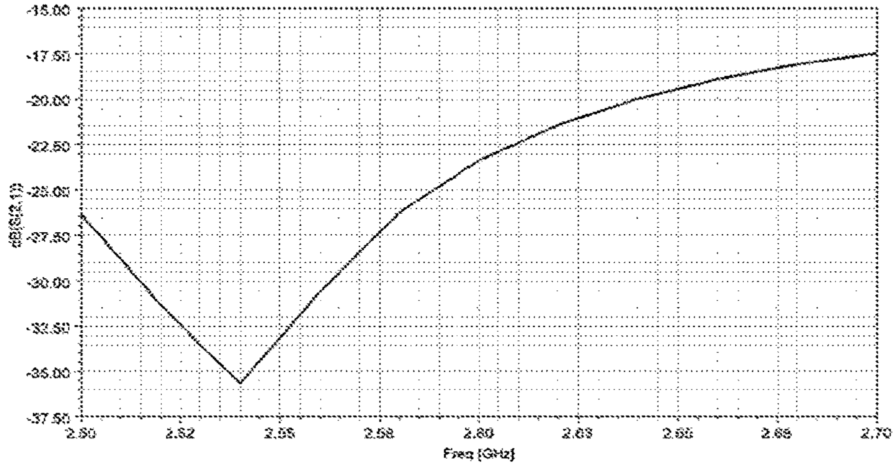
FIG. 9 is a schematic diagram illustrating isolation of an antenna according to an embodiment of the present disclosure.

FIG. 9 is a schematic diagram illustrating isolation of an antenna according to an embodiment of the present disclosure. As shown in FIG. 9, the antenna according to the embodiment of the present disclosure can ensure an excellent isolation less than −17.5 dB in the frequency band in a range from 2515 MHz to 2675 MHz, which reduces signal crosstalk among radio frequency ports, thereby improving communication quality.

Figure 10:
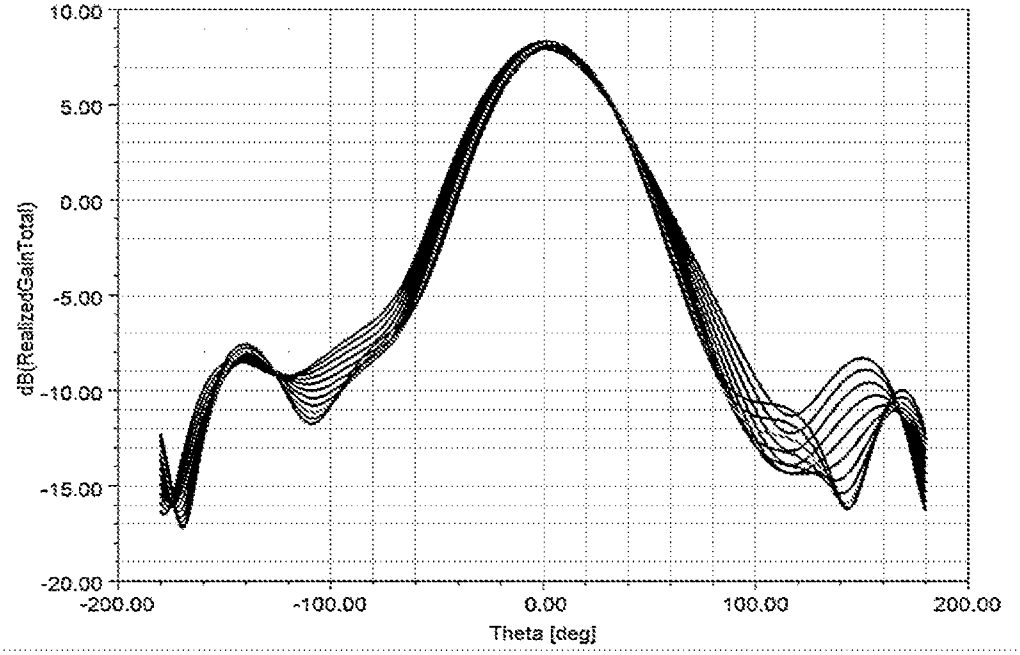
FIG. 10 is a schematic diagram illustrating a radiation pattern of a 0 degree plane of an antenna according to an embodiment of the present disclosure.

FIG. 10 is a schematic diagram illustrating a radiation pattern of a 0 degree plane of an antenna according to an embodiment of the present disclosure. As shown in FIG. 10, the antenna has a 3 dB vertical beam width of 45°±5°, and a 3 dB horizontal beam width of 63°±1°. The antenna of the embodiment of the present disclosure has a large field angle in a radiation horizontal plane, and can effectively cover a wider area.

Figure 11:
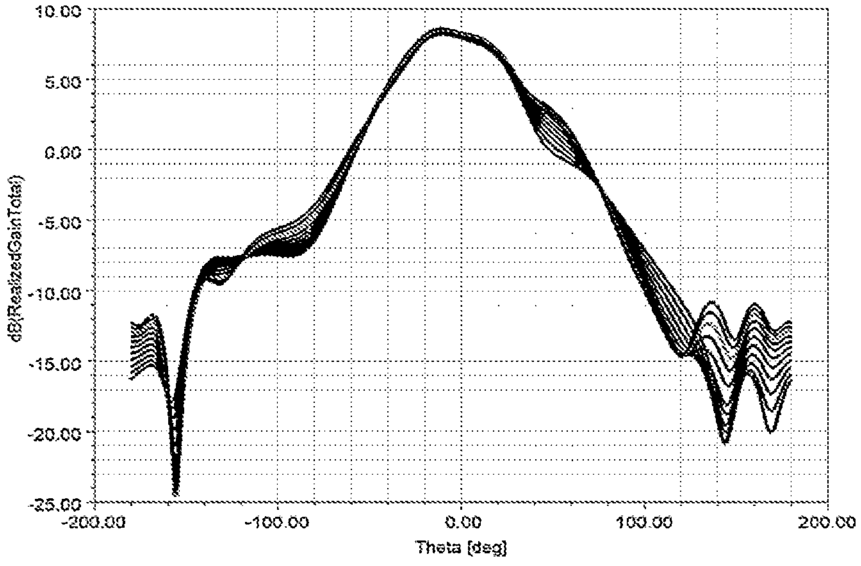
FIG. 11 is a schematic diagram illustrating a radiation pattern of a 90 degree plane of an antenna according to an embodiment of the present disclosure.

FIG. 11 is a schematic diagram illustrating a radiation pattern of a 90 degree plane of an antenna according to an embodiment of the present disclosure. As shown in FIG. 11, the antenna has a 3 dB vertical beam width of 45°±5°, and a 3 dB horizontal beam width of 62°±1°. The antenna of the embodiment of the present disclosure has a large field angle in a radiation horizontal plane, and can effectively cover a wider area.

Figure 12:
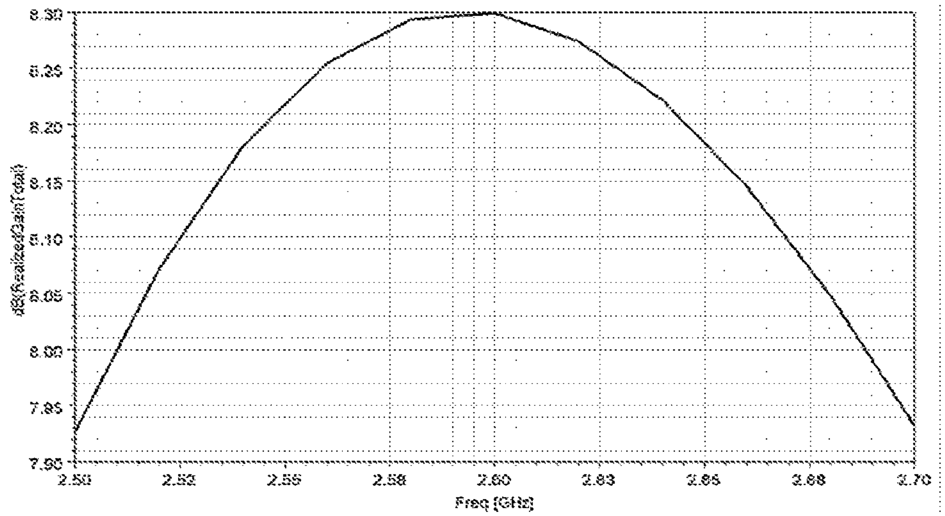
FIG. 12 is a schematic diagram illustrating a variation in a gain of an antenna with a frequency according to an embodiment of the present disclosure.

FIG. 12 is a schematic diagram illustrating a variation in a gain of an antenna with a frequency according to an embodiment of the present disclosure. As shown in FIG. 12, the antenna of the embodiment of the present disclosure may achieve a high gain greater than 7.9 dBi, and the gain is greater than 7.99 dBi in the frequency band in a range from 2515 MHz to 2675 MHz, which greatly ensures the excellent capability of transmitting and receiving signals of the antenna of the embodiment of the present disclosure.

Figure 13:
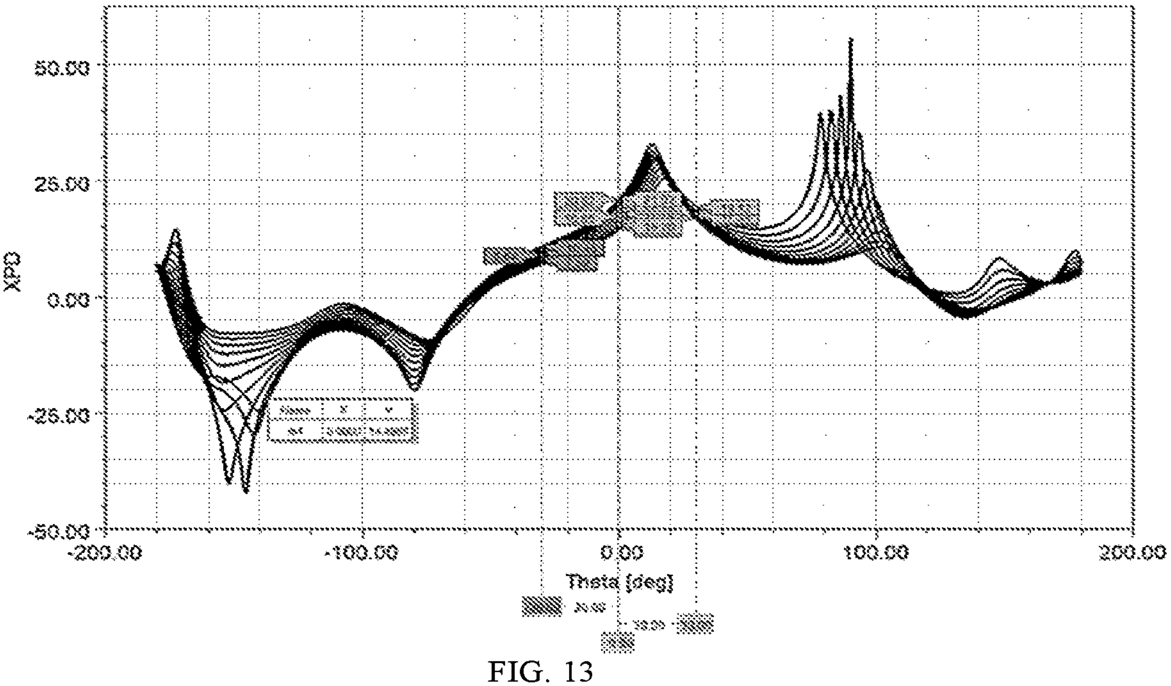
FIG. 13 is a schematic diagram illustrating a cross-polarization ratio of an antenna according to an embodiment of the present disclosure.

FIG. 13 is a schematic diagram illustrating a cross-polarization ratio of an antenna according to an embodiment of the present disclosure. As shown in FIG. 13, the antenna of the embodiment of the present disclosure has an excellent cross polarization ratio. A cross polarization ratio of an axial direction (0° radiation direction) is larger than 15 dB, which ensures that the signals received through dual polarization are uncorrelated to each other.

In a second aspect, the embodiment of the present disclosure provides an electronic device that may include the above antenna, which may be fixed inside a glass window.

A glass window system in the embodiment of the present disclosure may be used in a glass window system for an automobile, a train (including a high-speed rail), an aircraft, a building, or the like. The antenna may be fixed inside of the glass window (a side closer to a room). Because the optical transmittance of the antenna is high, the transmittance of the glass window is not greatly affected while realizing the communication function of the antenna, and such the antenna becomes a development trend for an aesthetic antenna. The glass window in the embodiments of the present disclosure includes, but is not limited to, double glass, single glass, laminated glass, thin glass, thick glass, or the like.

In some examples, the electronic device provided by embodiments of the present disclosure further includes a transceiver unit, a radio frequency transceiver, a signal amplifier, a power amplifier, and a filtering unit. The antenna in the electronic device may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by a transparent antenna in a communication system and is processed by the filtering unit, the power amplifier, the signal amplifier, and the radio frequency transceiver (not shown in the drawings), the transparent antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the transparent antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the transparent antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the communication system, the signal amplifier is used for improving a signal-to-noise ratio of the signals output by the radio frequency transceiver and then transmitting the signals to the filtering unit; the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the transparent antenna, and the antenna radiates the signals. In the process of receiving signals by the communication system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the electronic device provided by the embodiments of the present disclosure further includes a power management unit connected to the power amplifier and for providing the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising a housing, a first radiation layer and a first reference electrode layer within the housing; wherein the housing comprises: a first cover plate and a second cover plate opposite to each other, and a connection side plate connected between the first cover plate and the second cover plate; the first cover plate, the second cover plate and the connection side plate are connected together to form an accommodation space;

the first radiation layer is on a side of the first cover plate facing towards the second cover plate; and the first reference electrode layer is on a side of the second cover plate facing towards the first cover plate;

the first radiation layer comprises at least one radiation unit, each of which comprises a radiation portion and at least one feed line electrically connected to the radiation portion; and an orthographic projection of each of the radiation portion and the at least one feed line on the first cover plate at least partially overlaps with an orthographic projection of the first reference electrode layer on the first cover plate; and the first radiation layer and the first reference electrode layer each comprises a metal mesh structure, and orthographic projections of hollowed-out portions of the metal mesh structures of the first radiation layer and the first reference electrode layer on the first cover plate overlap with each other.

2. The antenna of claim 1, wherein in each radiation unit, the at least one feed line comprises a first feed line and a second feed line; and a node connected between the first feed line and the radiation portion is a first node; and a node connected between the second feed line and the radiation portion is a second node; and in the radiation unit, extending directions of a line connecting the first node and a center of the radiation portion and a line connecting the second node and the center of the radiation portion intersect with each other.

3. The antenna of claim 2, wherein the radiation unit further comprises a first branch connected to the first feed line and a second branch connected to the second feed line;

orthographic projections of a first end of the first feed line away from the radiation portion and a second end of the second feed line away from the radiation portion on the first cover plate are opposite to each other in a first direction;

the first branch and the second branch are connected to the first end and the second end, respectively; and orthographic projections of the first branch and the second branch on the first cover plate extend along the first direction and are opposite to each other in the first direction, and are within the orthographic projections of the first end of the first feed line and the second end of the second feed line.

4. The antenna of claim 1, wherein the first radiation layer is arranged on a first base material, which is connected to the first cover plate by a first adhesive layer.

5. The antenna of claim 1, wherein the first reference electrode layer is on a second base material, which is connected to the second cover plate by a second adhesive layer.

6. The antenna of claim 1, wherein the metal mesh structure has a line width in a range from 2 μm to 30 μm; a line spacing in a range from 50 μm to 200 μm; and a line thickness in a range from 1 μm to 10 μm.

7. The antenna of claim 1, wherein the first radiation layer further comprises a redundant electrode, which is disconnected from the radiation portion and the feed line, and is arranged in a same layer as the radiation portion and the feed line.

8. The antenna of claim 1, wherein the connection side plate comprises a first side sub-plate connected to the first cover plate and a second side sub-plate connected to the second cover plate; and the first side sub-plate and the second side sub-plate are connected in a plug-in manner.

9. The antenna of claim 1, wherein the radiation portion comprises a center-symmetric pattern.

10. The antenna of claim 1, wherein the first cover plate and the second cover plate each has a thickness in a range from 1 mm to 3 mm.

11. An electronic device, comprising the antenna of claim 1.

12. The antenna of claim 3, wherein the first radiation layer is arranged on a first base material, which is connected to the first cover plate by a first adhesive layer.

13. The antenna of claim 12, wherein the first reference electrode layer is on a second base material, which is connected to the second cover plate by a second adhesive layer.

14. The antenna of claim 11, wherein the first radiation layer further comprises a redundant electrode, which is disconnected from the radiation portion and the feed line, and is arranged in a same layer as the radiation portion and the feed line.

15. The antenna of claim 14, wherein the connection side plate comprises a first side sub-plate connected to the first cover plate and a second side sub-plate connected to the second cover plate; and the first side sub-plate and the second side sub-plate are connected in a plug-in manner.

16. The antenna of claim 15, wherein the radiation portion comprises a center-symmetric pattern.

* * * * *